United States Patent
Dean et al.

(10) Patent No.: US 9,644,137 B2
(45) Date of Patent: May 9, 2017

(54) METHOD OF CRYOGENIC ACID FRACKING

(71) Applicant: CONOCOPHILLIPS COMPANY, Houston, TX (US)

(72) Inventors: Ricky H. Dean, Houston, TX (US); Joseph H. Schmidt, Galveston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 14/613,717

(22) Filed: Feb. 4, 2015

(65) Prior Publication Data
US 2015/0218439 A1    Aug. 6, 2015

Related U.S. Application Data

(60) Provisional application No. 61/935,576, filed on Feb. 4, 2014.

(51) Int. Cl.
*E21B 43/26* (2006.01)
*C09K 8/62* (2006.01)
*C09K 8/72* (2006.01)

(52) U.S. Cl.
CPC .................. *C09K 8/72* (2013.01); *C09K 8/62* (2013.01); *E21B 43/26* (2013.01)

(58) Field of Classification Search
CPC .. C09K 8/62; C09K 8/72; E21B 43/26; E21B 36/001
USPC .................................................. 166/308.2
See application file for complete search history.

(56) References Cited

U.S. PATENT DOCUMENTS

| | | | | |
|---|---|---|---|---|
| 3,358,763 A | * | 12/1967 | Petty | E21B 21/16 166/302 |
| 5,168,930 A | * | 12/1992 | Wiseman | C09K 8/72 166/307 |
| 2003/0085036 A1 | * | 5/2003 | Curtis | E21B 21/065 166/267 |
| 2007/0114022 A1 | * | 5/2007 | Nguyen | C09K 8/5083 166/250.1 |
| 2013/0126169 A1 | * | 5/2013 | Al-Nakhli | E21B 43/26 166/300 |
| 2013/0306321 A1 | * | 11/2013 | Lanctot-Downs | C09K 8/70 166/308.1 |
| 2013/0333892 A1 | * | 12/2013 | McClung, IV | E21B 43/26 166/308.3 |

OTHER PUBLICATIONS

SPE 21036, Factors Influencing the Reaction Rate of Hydrochloric Acidand Carbonate Rock ,NA Mumallah, Phillips Petroleum Co. (1991).*

* cited by examiner

*Primary Examiner* — Catherine Loikith
(74) *Attorney, Agent, or Firm* — Boulware & Valoir

(57) ABSTRACT

A method of fracking carbonate-rich reservoirs, comprising injecting a cryogenic or chilled fluid followed by an acid into the reservoir, allowing the acid to etch the reservoir, and thereby increasing production of a fluid, such as water, oil or gas, from the reservoir. Further, injecting a preflush into the reservoir and later injecting a postflush into the reservoir to displace the acid from the tubulars into the reservoir.

17 Claims, 3 Drawing Sheets

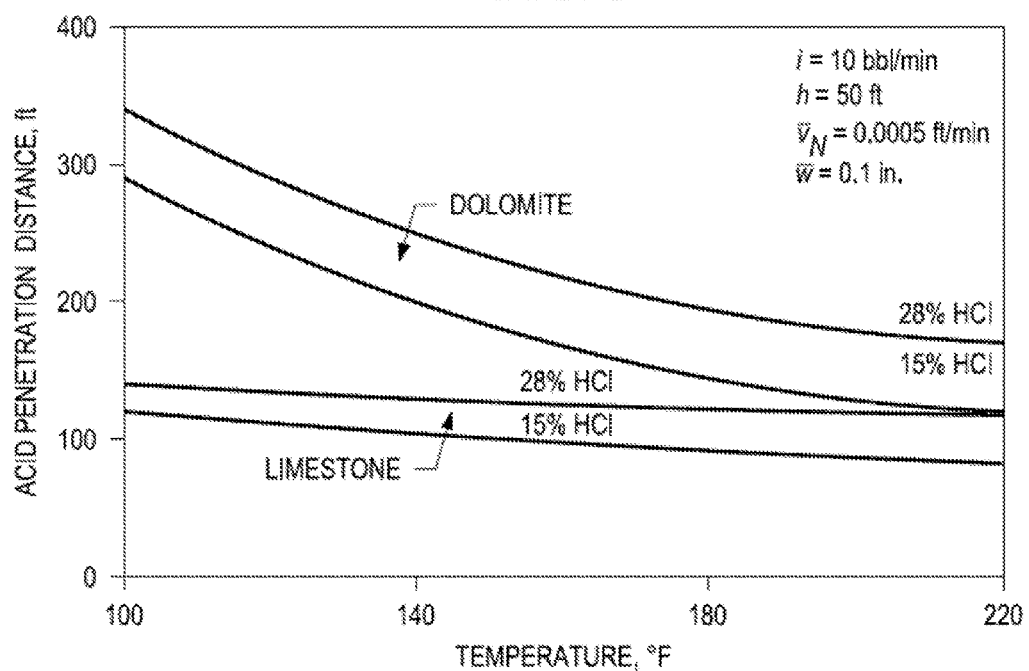

METHOD OF CRYOGENIC ACID FRACKING

CROSS-REFERENCE TO RELATED APPLICATIONS

This application is a non-provisional application which claims the benefit of and priority to U.S. Provisional Application Ser. No. 61/935,576 filed Feb. 4, 2014, entitled "CRYOGENIC ACID FRACK," which is hereby incorporated by reference in its entirety.

FEDERALLY SPONSORED RESEARCH STATEMENT

Not applicable.

FIELD OF THE DISCLOSURE

The disclosure generally relates to cryogenic fracturing of carbonate-rich formations.

BACKGROUND OF THE DISCLOSURE

In many formations, chemical and/or physical processes alter the reservoir rock over geologic time. Sometimes, these diagenetic processes restrict the openings in the rock and reduce the ability of fluids to flow through the rock. If fluids cannot flow, it will be difficult to produce oil, gas or water from a well. Thus, low permeability reservoirs are often fractured to increase their production of fluids.

Hydraulic fracturing is the process of pumping fluid into a wellbore at an injection rate that is too high for the formation to accept without breaking. During injection the resistance to flow in the formation increases, the pressure in the wellbore increases to a value called the break-down pressure, that is the sum of the in situ compressive stress and the strength of the formation. Once the formation "breaks down," a fracture is formed, and then injected fluid can flow through it. From a limited group of active perforations, ideally a single, vertical fracture is created that propagates in two "wings" being 180° apart and identical in shape and size, but in practice may have a different shape and size because of local in-homogeneities. In naturally fractured or cleated formations, it is possible that multiple fractures are created and/or the two wings evolve in a tree-like pattern with increasing number of branches away from the injection point.

In general, hydraulic fracture treatments are used to increase the productivity index of a producing well or the injectivity index of an injection well. The productivity index defines the rate at which oil or gas can be produced at a given pressure differential between the reservoir and the wellbore, while the injectivity index refers to the rate at which fluid can be injected into a well at a given pressure differential.

Fluid not containing any solid (called the "pad") is injected first, until the fracture is wide enough to accept a propping agent. The purpose of the propping agent is to keep apart the fracture surfaces once the pumping operation ceases. In deep reservoirs, man-made ceramic beads are used to hold open or "prop" the fracture (see e.g., FIG. 1). In shallow reservoirs, sand is normally used as the propping agent.

Acid fracking is another technique that is sometimes used for carbonate-rich plays. Although many formations in North America are sandstone and require the use of granular propping agents, acid fracturing is more commonly used in Europe and the Middle East, especially in Bahrain and Saudi Arabia. In general, acid fracturing is best applied in shallow, low-temperature carbonate reservoirs, the best candidates having a temperature less than 200° F. Low temperature reduces the reaction rate between the acid and the formation, which allows the acid to penetrate deeper into the fracture before becoming spent.

Cost is another consideration when selecting acid-fracturing candidates. In hot reservoirs, expensive chemicals are required to inhibit the acid-reaction rate with the steel tubular goods and to retard the reaction rate with the formation. Thus, in deep, hot reservoirs, the cost of an acid-fracturing treatment can easily exceed the costs of a proppant-fracture treatment, making such techniques uneconomic.

The most commonly used fluid in acid fracturing is 15% hydrochloric acid (HCl). To obtain more acid penetration and more etching 28% HCl is sometimes used as the primary acid fluid. On occasion, formic acid (HCOOH) or acetic acid ($CH_3COOH$) is used because these acids are easier to inhibit under high-temperature conditions. However, acetic and formic acid cost more than HCl, discouraging their use.

The reactions of HCl by carbonate (1) and dolomite (2) are shown:

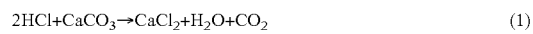
(1)

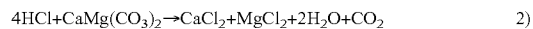
2)

Mullamah (1991) studied reaction rate and how it varies with temperature, pressure, concentration, gravity and injection rate. He made the following conclusions:

1. The reaction rate increases with temperature up to 200° F. At temperatures higher than 200° F. the reaction rate becomes insensitive to increases in temperature.

2. The reaction at high temperatures requires pressures high enough to maintain the released $CO_2$ dissolved in the spent acid solution. A system pressure of 1000 psi is not sufficient.

3. The reaction rate decreases as the pressure increases even when the pressure is high enough to maintain the released $CO_2$ in solution. This is due to the effect of $CO_2$ bubbles at the surface form a barrier between the approaching HCl molecules and the solid surface. Also the bubbles change the hydrodynamics of the boundary layer from laminar to transition or turbulent flow conditions.

4. The reaction rate increases as the acid concentration is increased up to 15% HCl. At higher acid concentrations the reaction rate decreases as the acid concentration increases.

5. The reaction rate increases as the injection rate increases. This is because the boundary layer decreases, and thus more contact with fresh acid occurs. The thickness of the boundary layer is inversely proportional to the square root of the fluid velocity regardless of the flow system used for the reaction.

6. The reaction rate is highest when the acid is flowed in the direction of the gravitational force.

In acid fracking, typically a gelled water or crosslinked gel fluid is used as the pad fluid to fill the wellbore and break down the formation. The water-based pad is then pumped to create the desired fracture height, width, and length for the hydraulic fracture. Once the desired values of created fracture dimensions are achieved, the acid is then pumped into the well and travels down the fracture to etch the walls of the fracture to increase conductivity (see FIG. 2).

Because the acid is reactive with the formation, fluid loss is a primary consideration in the fluid design. Large amounts of fluid-loss additives are generally added to the acid fluid to minimize fluid leakoff. Fluid-loss can be extreme in high permeability and/or naturally fractured carbonate formations, thus making long etched fractures difficult to obtain.

The main difference between acid fracturing and proppant fracturing is the way fracture conductivity is created. In proppant fracturing, a propping agent is used to prop open the fracture after the treatment is completed. In acid fracturing, acid is used to "etch" channels in the rock that comprise the walls of the fracture. Thus, the mineral has to be partially soluble in acid so that channels can be etched in the fracture walls. As such, the application of acid fracturing is confined to carbonate-rich reservoirs and is not used to stimulate sandstone, shale, or coal-seam reservoirs. Nevertheless, long etched fractures are difficult to obtain, because of high leakoff and rapid acid reaction with the formation.

Cryogenic fracturing has also been proposed, wherein very cold or cryogenic liquids are used in the fracking process. Expired patent, U.S. Pat. No. 3,822,747 by Maguire, for example, discloses creating a network of fractures is formed by injecting liquefied gases, such as liquid nitrogen (LN2), into a wellbore. As the liquefied gas vaporizes in the closed borehole, the resulting increase in pressure forms an initial group of fractures in the formation proximate to the borehole.

U.S. Pat. No. 7,823,644, U.S. Pat. No. 7,516,784, U.S. Pat. No. 7,784,545, U.S. Pat. No. 7,416,022, U.S. Pat. No. 7,264,049, and U.S. Pat. No. 7,198,107, also by Maguire, relate to methods for in-situ production of oil and other hydrocarbons, wherein a network of fractures is formed by injecting LN2 into at least one substantially horizontally disposed fracturing borehole.

U.S. Pat. No. 7,500,517, U.S. Pat. No. 7,789,164 and U.S. Pat. No. 8,104,536 generally relate to a method for the production of kerogen and other hydrocarbons from a reservoir, such as shale oil reservoirs, by pressurizing the formation with liquid or supercritical $CO_2$ or other dense phase gases, and depressurizing the well to further fracture the formation. In this method associated adiabatic expansion of the $CO_2$ cools the subsurface shale formation and causes thermal and mechanical stresses within the formation, which in turn leads to fracturing of the formation.

CA2777449 teaches LN2 use as a cryogenic fracking agent, and notes that it can be used together with an acid additive. However, that patent does not contemplate acid fracking therein, but only suggests low level acid use to scour tube perforations and clean up the near-wellbore area, or as corrosion inhibitors, scale inhibitors and iron controllers.

However, although many have performed test runs and research relating to cryogenic fracturing, the method has not been extensively employed in oil and gas production, and there remains further need to develop and optimize these methods for particular applications. This disclosure meets one or more of those needs.

SUMMARY OF THE DISCLOSURE

Hydrochloric acid reacts so quickly with limestone that by the time placement is complete, the acid is already spent, regardless of the downhole temperature and pressure. Chemical retardants, such as emulsifiers and gelling agents, may be added to extend the reaction time, but these are costly and of limited effectiveness. Higher-strength acid increases the penetration distance in the fracture before the acid spending, but stronger acids are more corrosive to equipment and more dangerous to workers, as well as more costly.

As temperature increases, the reaction rate also increases and the acid penetration distance will decrease. In fact, the reaction rate doubles every time the temperature increases 18° F., thus reducing penetration. See FIG. 3. This suggests that reduced temperature will greatly aid in acid fracturing, by slowing down the reaction, and indeed is the reason that most acid fracks are performed on cool shallow wells.

Therefore, we suggest herein the use of cryogenic carrier fluids to greatly decrease the temperature, slowing the reaction rate down significantly and allowing the acid to reach much deeper into the reservoir before being spent. The cold carrier fluid also creates thermal stresses in the rock and freezes the in situ water, creating mechanical stresses. Both of these stresses increase the fracturing of the rock, creating localized rubble that can serve as proppant. Thus, cryogenic acid fracking creates a rubble zone that extends outward from the main fracture face. The rubble aids in propping open fractures, and decreases blockage due to fines, which tends to be an issue for acid fracking.

The cryogenic acid frack method has several advantages over conventional hydraulic fractures:

1) eliminates hydraulic fracture induced water blockage,
2) increases fracture network and surface area and where applicable increases desorption of hydrocarbons because of adsorption of nitrogen,
3) reduces water use,
4) retards the acid reaction rate allowing deeper acid penetration before reacting with the carbonate-rich formation, and
5) freezes immobile in situ water increasing pore pressure driving the reservoir rock into shear failure forming rubblized shale particles that serve as proppant.

Ultimately this invention will provide a way to increase production from carbonate-rich plays. By "carbonate-rich" reservoirs we refer to any and all of the carbonate containing minerals that can be acid etched, including hydrates carbonates, anhydrous carbonates, anhydrous carbonates with compound formulas, and carbonates with halogens or hydroxyls. Thus, the term includes e.g., calcite or calcium carbonate, $CaCO_3$, the chief constituent of limestone, dolomite, a calcium-magnesium carbonate $CaMg(CO_3)_2$; and siderite or iron(II) carbonate, $FeCO3$, sodium carbonate, potassium carbonate, and the like.

By "cryogenic fluid" herein we mean a cold pumpable fluid that reduces the reaction rate of acid with carbonate containing minerals by at least half. Cryogenic fluids that can be used in the invention include LN2, liquid helium liquid $CO_2$, and the like. Chilled propane, water methanol mixtures, LNG are other alternatives. Cryogenic fluids are well below the freezing point of water, preferably at or below −100° C., or −150° C.

LN2 is particularly preferred since it can be made on-site as needed from air, which is 80% nitrogen. Liquid nitrogen can be produced from the cryogenic distillation of liquefied air. An air compressor is used to compress filtered air to high pressure; the high-pressure gas is cooled back to ambient temperature, and allowed to expand to a low pressure. The expanding air cools greatly (the Joule-Thomson effect), and oxygen, nitrogen, and argon are separated by further stages of expansion and distillation. Nitrogen generators are commercially available, e.g. from Compressed Gas Technologies Inc., MMR technologies, Inc., Cyromech Inc. to name a few.

Liquid nitrogen or "LN2" is nitrogen in a liquid state at an extremely low temperature. At atmospheric pressure, liquid nitrogen boils at −196° C. (77° K, −321° F.), and thus the temperature is generally kept below −321° F. LN2 is a colorless clear liquid with density of 0.807 g/mL at its boiling point and a dielectric constant of 1.43.

The cryogenic acid frack can include other typical steps used in acid fracking, including prior hydraulic fracking if permeability is low, preflush, e.g., if needed to clean the near wellbore and/or increase wettability, injection of gas to increase bottom hole pressure (BHP), as well as post acidizing steps such as shut-in, afterflush, and the like.

Following preparation of the well, the formation to be treated is generally first broken down by pumping preflush fluid into the formation at a high rate. The rate required will depend on the permeability of the carbonate rock, the viscosity of the fluid used as a preflush, the fracture gradient, and the depth of the formation. Pumping rates on the order of from 1 to 20 barrels per minute have been satisfactory in most limestone and dolomite formations but lower rates are sometimes effective, particularly if the permeability is low or the preflush contains a thickening agent or other additives which retard entry of the fluid into the pore spaces. Breakdown of the formation and the generation of a fracture is normally indicated by a sudden reduction in the pressure at the surface. After this occurs, pumping of the preflush is continued until from about 1 to about 12 times the volume of acid to be used has been injected into the fracture. The use of from about 2 to about 6 volumes of preflush for each volume of acid to be injected is preferred.

The preflush employed will normally be a brine containing 3 percent or more sodium chloride but fresh water can be used where clay swelling is not a problem. Aqueous solutions containing other salts and more concentrated brines are also feasible. Water-soluble polyacrylamides and similar polymers that function as friction reducers; thickening agents such as the biopolymers produced by the action of bacteria of the genus *Xanthomonas* on carbohydrates; surface active agents which serve as demulsifiers; corrosion inhibitors; clay stabilizers; and other additives may be incorporated in the preflush if desired. A variety of different additives designed to overcome difficulties encountered during well treating operations have been suggested heretofore and will be familiar to those skilled in the art. Any additives utilized in the perish should be compatible with the acid and cryogenic fluid employed in the cryogenic acid frack.

Alternatively, the preflush can comprise a cryogenic fluid, such as chilled propane or methanol, LN2, LNG and the like, so as to precool the reservoir.

Corrosion inhibitors, demulsifiers, surface tension reducing agents, chemical retarding agents, clay stabilizers, friction reducers and other additives referred to above may be incorporated in the acid solutions if desired. Care should again be taken that the additives selected are compatible with the acid, as well as with the cryogenic carrier fluid.

The quantities in which the organic acids or acid solutions are employed will depend in part upon the thickness of the formation and the distance to which acid penetration is desired. In general, however, the quantities used will range from about 20 to about 1000 gallons of acid or acid solution per foot of formation thickness, and range in concentration from 5-50%, but more preferably from 10-30%, depending on the acid. The use of from about 20 to about 1000 gallons per foot is generally sufficient to overcome formation damage and produce a substantial improvement in the injection or production rate. In certain massive formations, the use of larger quantities is advantageous, particularly where substantial acidizing of the matrix is desired. In particular, this provides the ability to inject more acid using this technique because the acid will remain alive penetrating deeper into the formation.

Methods that can be used to calculate fracture dimensions and are therefore helpful in designing acid fracturing operations have been disclosed in the literature and will be familiar to those skilled in the art. In using such methods, the total quantity of preflush and acid to be employed should be considered. The volume of the afterflush is generally ignored. As pointed out earlier, the amount of preflush employed will normally be from about 1 to about 12 times the quantity of acid to be used. The afterflush is generally employed in similar quantities. Without being limited by theory, it is believed that the amount of fluid leaking off into the reservoir matrix will be reduced because fluid in pore spaces will be cooled, if not frozen, rendering it immobile. Fractures may be created giving the appearance of leakoff which is desirable, creating a network that can accept acid thereby opening the formation to conductive fracture surfaces and increasing the effective reservoir permeability.

In one embodiment, LN2 and an acid (15% HCL freezes at −4° F. while Liquid Nitrogen is at about −300° F.) are injected into the well. The process may include pumping a preflush to establish wellbore/formation connectivity, followed by a warm Nitrogen gas to displace the water. The nitrogen may be heated using the heater on the nitrogen delivery vehicles or through heat exchange during pumping. This is followed by the liquid Nitrogen to cool the reservoir fracture face, followed by a warm gas spacer to push the cold nitrogen into the formation. Liquid acid is injected, followed by a spacer to flush the wellbore and over displace the HCL away from the wellbore protecting the casing. The well is then shut-in allowing the Nitrogen and acid to warm up, the Nitrogen gasifies and the HCL reacts with the carbonate streak. A side advantage to this technique is that it allows us to acid fracture deeper and hotter reservoirs at injection pressures that are typical for conventional hydraulic fracture pressure. Since the temperature is extremely low, the acid will tend to penetrate the reservoir quite deeply before the temperature increases to the point to allow significant acid reactivity. Injection rate will also influence the rate of warming. Thus, injection rate can vary throughout the etch, a faster injection allowing deeper penetration.

In another embodiment, a preflush is pumped to establish wellbore/formation connectivity followed by warm Nitrogen gas through pump truck heater to displace the water. This is followed by liquid Nitrogen to cool the reservoir fracture face which is followed by a cool −4° C. gas spacer followed by cool liquid 15-20% HCL. The well is then shut-in allowing the Nitrogen and HCL to warm up, the Nitrogen gasifies and the HCL reacts with the carbonate steaks. A side advantage to this technique is that it allows acid fracture for deeper and hotter reservoirs.

The acid concentration at the leading edge of the reactive acid will decrease due to reaction with the carbonate and/or dilution by connate water, but since fresh acid will continually arrive, a bank of unspent acid will built up around the fracture thus etching and enlarging it. Any unspent acid will then be available for further reaction even deeper in the formation.

The afterflush, which may be water, brine or an aqueous solution containing additives of the type referred to above, is injected into the fracture to displace the acid into the adjacent formation. Injection is continued until a volume equivalent to from about 1 to about 12 times the acid volume has been introduced into the fracture. Additionally the afterflush may be cool water or a chilled solution using freeze protected water below freezing temperatures.

At this point, the well is shut-in and allowed to stand. As the fracture closes, fluids in the formation tend to move parallel to the fracture walls so that mixing of the concentrated acid and afterflush takes place. This solubilizes the salts formed on initial reaction of the acid with the carbonate rock and can promote further acid attack. Further attack also takes place at the interface between the acid and the preflush as the fluids move back toward the wellbore following closure of the fracture. The shut-in period may range from a few hours to several days.

After the fracture has closed and the pressure has declined, the well is opened to permit the backflow of fluids into the wellbore. The insoluble reaction products previously formed are solubilized as the fluids move back toward the wellbore and further dilution of the acid takes place. This exposes new surfaces to acid attack and thus promotes an additional increase in permeability. The fluids produced into the wellbore are normally substantially free of unreacted acid. After the injected fluids have been produced, the well may be returned to normal production.

HCL is most commonly used in acid fracking procedures, usually at about 15% by weight, although some recommend increasing concentration to 20%. However, other acids can be used.

Acetic acid ($CH_3COOH$) is a weakly-ionized, slow-reacting organic acid. A thousand gallons of 10% acetic acid will dissolve about 704 lb. of limestone. The cost of dissolving a given weight of limestone is greater with acetic acid than with HCl acid. However, acetic acid is relatively easy to inhibit against corrosion and can usually be left in contact with tubing or casing for days without danger of serious corrosion. Because of this characteristic, acetic acid is frequently used as a perforating fluid in limestone wells. Other advantages of acetic acid in comparison to HCl acid are:

1. Acetic acid is naturally sequestered against iron precipitation.
2. It does not cause embrittlement or stress cracking of high strength steels.
3. It will not corrode aluminum.
4. It will not attack chrome plating up to 200° F.

Formic acid (HCOOH) is a weakly-ionized, slow reacting organic acid. It has somewhat similar properties to acetic acid. However, formic acid is more difficult to inhibit against corrosion at higher temperatures and does not have the widespread acceptance and use of acetic acid.

Hydrofluoric acid used in oil, gas, or service wells is normally 3% HF combined with 12% HCl. It is employed exclusively in sandstone matrix treatments to dissolve either natural clays or clays which have migrated into the formation. One thousand gal of 4.2% HF acid will dissolve 700 lb. of clay. Fast reaction time and precipitants make HF acid undesirable in carbonate-containing sands having more than 20% solubility in HCl. Thus, it is generally believed that HF acid should not be used in carbonate formations; however, the cryogenic fluid may allow increased use of this strong acid at about 0-6%.

Sulfamic acid, a granular-powdered material, reacts about as fast as HCl. The primary advantage of sulfamic acid is that it can be hauled to the location as a dry powder and then mixed with water. Unless sulfamic acid is modified, it will not dissolve iron oxides or other iron scales. Because of its molecular weight, the amount of calcium carbonate dissolved by one pound of sulfamic acid is only about one-third that dissolved by an: equal weight of HCl acid. Acidizing with sulfamic acid is normally much more expensive than with HCl acid. Sulfamic acid is not recommended for temperatures above 180° F. because it will hydrolyze to form sulfuric acid. When $H_2SO_4$ reacts with limestone or $CaCO_3$ scale, calcium sulfate will be precipitated.

The use of acid can create a number of well problems. Acid may (1) release fines that plug the formation, (2) form emulsions, (3) create sludge, and (4) corrode steel. Additives are available to correct these and a number of other problems. Some common used additives are described below:

Surfactants:

Surfactants are in acid jobs to reduce surface and interfacial tension, to prevent emulsions, to water wet the formation, and to safeguard against other associated problems. Swabbing and clean-up time after acidizing oil and gas wells can be reduced by lowering surface tension.

Suspending Agents:

Most carbonate formations contain insolubles which can cause blocking in formation pores or fractures if the fines released by acid are allowed to settle and bridge. Suspension should be differentiated from dispersion. Dispersed particles usually settle in a short time. Clean-up after fracture acidizing can be accelerated by use of a suspending agent.

Sequestering Agents:

Sequestering agents act to complex ions of iron and other metallic salts to inhibit precipitation of iron as HCl is spent. During acidizing if hydrated oxides of iron are not prevented from dropping out, these insoluble iron compounds may be re-deposited near the wellbore and cause permanent plugging. Sequestering agents should always be used if rusty tubing or casing is to be contacted.

Anti-Sludge Agents:

Some crudes, particularly heavy asphaltic crudes, from an insoluble sludge when contacted with acid. The primary ingredients of a sludge are usually asphaltenes, but sludges may also contain resins and paraffin waxes, high-molecular weight hydrocarbons, and formation fines or clays. Addition of certain surfactants can prevent sludge formation by keeping colloidal material dispersed.

Corrosion Inhibitors:

Corrosion inhibitors temporarily slow down the reaction of acid on metal. Corrosion inhibition time varies with temperature, acid concentration, type of steel, and inhibitor concentration. Both organic and inorganic corrosion inhibitors have application in acidizing. Some organic inhibitors are effective up to the 300° F. range. Extenders have been developed to increase the effective range to 400° F. Inorganic arsenic inhibitor can be used up to at least 450° F. Since corrosion is slowed at cryogenic temperatures, it is expected that the level of these additives can be reduced, providing a cost savings.

Alcohol:

Normally methyl or isopropyl alcohol in concentrations of 5% to 30% by volume of acid, is mixed with acid to lower surface tension. The use of alcohol in acid will accelerate the rate of well clean-up and improve clean-up, particularly in dry gas wells. Disadvantages are increased inhibitor problems and possible salt precipitation.

Fluid Loss Control Agents:

Fluid loss control agents may be required to reduce acid leak-off in fracture acidizing. The preferred method of selecting fluid loss control agents is to run fluid loss tests on cores from the formation to be acidized.

Diverting or Bridging Agents:

Acids will usually follow the path of least resistance, usually the lesser damaged intervals, unless diverting or bridging agents are employed to allow relatively uniform acidizing of various porous zones open to the wellbore.

Certain agents (e.g., methanol-acid) may be added to lower the freezing point of the acid. In some embodiments, the acid-methanol mixture may be crosslinked to promote carrying of proppant. In some embodiments, the acid may be gelled prior to pumping it downhole.

The invention includes the following one or more embodiments, in any combination thereof:

A method of stimulating a reservoir for increased production of oil and gas; said method comprising: a) selecting a reservoir that is a carbonate-rich reservoir; b) injecting a mixture of cryogenic fluid and at least 15% acid into said reservoir; c) allowing said mixture to etch and enlarge existing fractures in said reservoir; and d) producing oil or gas from said etched reservoir.

The method wherein said injection step b) is preceded by injection of a fracturing fluid to fracture of the reservoir; wherein said injection step b) is preceded by a preflush and followed by an afterflush; wherein said injection step b) is preceded by injection of a fracturing fluid to increase the fracturing of the reservoir, followed by a preflush and wherein said injection step b) is followed by an afterflush.

A method of acid fracking a carbonate-rich reservoir; said method comprising a) providing a wellbore in a carbonate-rich reservoir; b) injecting a preflush fluid at a pressure high enough to fracture said reservoir; c) injecting a warm nitrogen gas followed by cryogenic nitrogen followed by a warm nitrogen spacer; d) injecting an acid solution; e) flushing with either warm nitrogen, a liquid post flush or both warm nitrogen and a liquid post flush e) then the well is shut in allowing the nitrogen to gasify; f) allowing said acid mixture to etch said fractures; and g) opening said well for backflow and production of hydrocarbons.

A method of acid fracking a carbonate-rich reservoir; said method comprising providing a wellbore in a carbonate-rich reservoir; injecting a fracture fluid at a pressure high enough to fracture said reservoir; injecting a preflush into said reservoir; injecting a mixture of cryogenic fluid, solvent, and acid into said wellbore; injecting a postflush into said reservoir; shutting said wellbore in and allowing the well to stand; opening said well for backflow and production of hydrocarbons.

An improved method of acid fracturing a carbonate-rich reservoir, wherein acid is injected into a partially fractured reservoir and etches and enlarges said partial fractures, thus stimulating production of a fluid from said reservoir, the improvement comprising injecting a mixture of LN2 and acid into said reservoir, such that the LN2 reduces the reaction rate of said acid, allowing said acid to penetrate deeper into said reservoir, thus stimulating increased production of said fluid from said reservoir.

In one embodiment a carbonate-rich reservoir is stimulated to increase production of oil and gas by injecting a preflush into the reservoir; injecting a warm gas flush into the reservoir; injecting a cryogenic fluid into the reservoir; injecting an acid into the reservoir; injecting a postflush displacing the acid into the reservoir then shutting in the well allowing said mixture to etch and enlarge existing fractures in the reservoir. This will increase produced oil and gas from said etched reservoir.

An improved method of acid fracturing a carbonate-rich reservoir, wherein acid is injected into a partially fractured reservoir and etches and enlarges said partial fractures, thus stimulating production of a fluid from said reservoir, the improvement comprising injecting a cryogenic liquid into said partially fractured reservoir, such that the cryogenic liquid reduces the reaction rate of said acid, allowing said acid to penetrate deeper into said reservoir thus enlarging said partial fractures deeper in said reservoir, thus stimulating increased production of said fluid from said reservoir.

There may be a preflush that includes or is preceded by injection of a fracturing fluid to fracture the reservoir.

The cryogenic fluid may include liquid nitrogen, liquid natural gas, liquid propane (R290), liquid ethane (R170), liquid carbon dioxide (R744), liquid nitrous oxide (R744A), liquid ethylene (R1150), liquid ammonia (R717), liquid butane (R600), liquid sulphur dioxide (R764), liquid sulfur hexafluoride, liquid helium, or any combination thereof.

Acids useful in the present invention include hydrochloric acid, muriatic acid, acetic acid, acrylic acid, boric acid, formic acid, glutaraldehyde, mercaptoacidic acid, sodium chlorate, sodium hypochlorate, sulfuric acid, phosphonic acid, and combinations thereof.

In one embodiment, the cryogenic liquid is liquid nitrogen and the acid is hydrochloric acid.

The cryogenic liquid may be combined with a solvent comprising kerosene, diesel, naphtha, natural gas condensates, petroleum distillates, ethylene glycol, and combinations thereof.

The cryogenic flush may include a preflush with warm gas or a postflush with warm gas. Warm gas can be obtained by simply either removing gas from the top of the cryogenic storage, warming the cryogenic liquid to a gas temperature using a heater on the gas delivery vehicle, or running the cryogenic liquid through a heat exchange to warm it to a gas temperature. Warm gas is simply any temperature that is above the liquid temperature for the cryogenic liquid.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention, such as instructions for use, buffers, salts, and the like.

The following abbreviations are used herein:

| ABBREVIATION | TERM |
| --- | --- |
| LN2 | Liquid nitrogen aka LN or LIN |
| BHP | Bottom hole pressure |
| Frack | Short for fracture, see also fracking |
| LNG | Liquid natural gas |

BRIEF DESCRIPTION OF THE DRAWINGS

A more complete understanding of the present invention and benefits thereof may be acquired by referring to the follow description taken in conjunction with the accompanying drawings in which:

FIG. 3. graph showing effect of temperature on acid penetration distance under various conditions.

DETAILED DESCRIPTION

Figure 1:
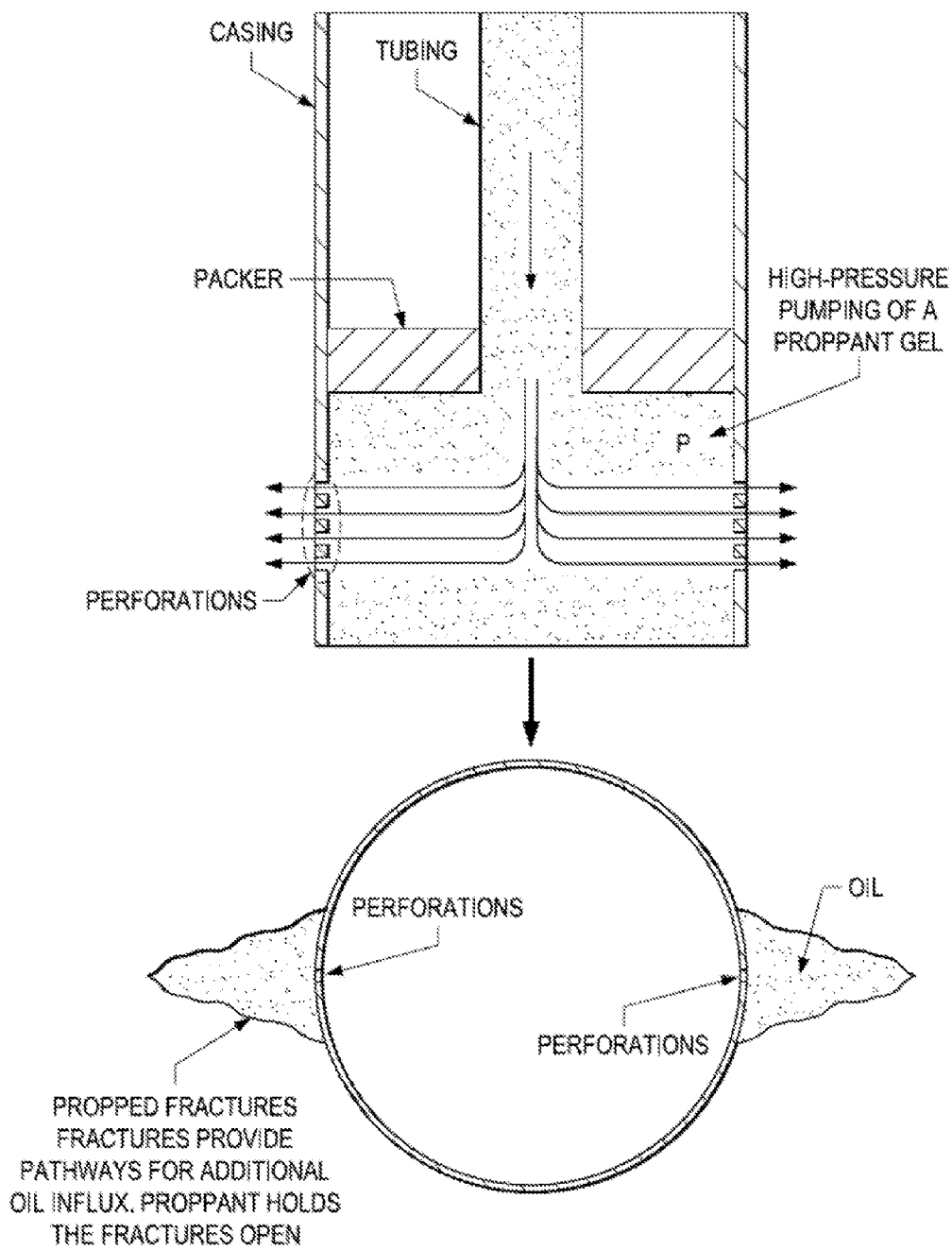
FIG. 1. schematic of hydrofracking Not drawn to scale.
Figure 2:
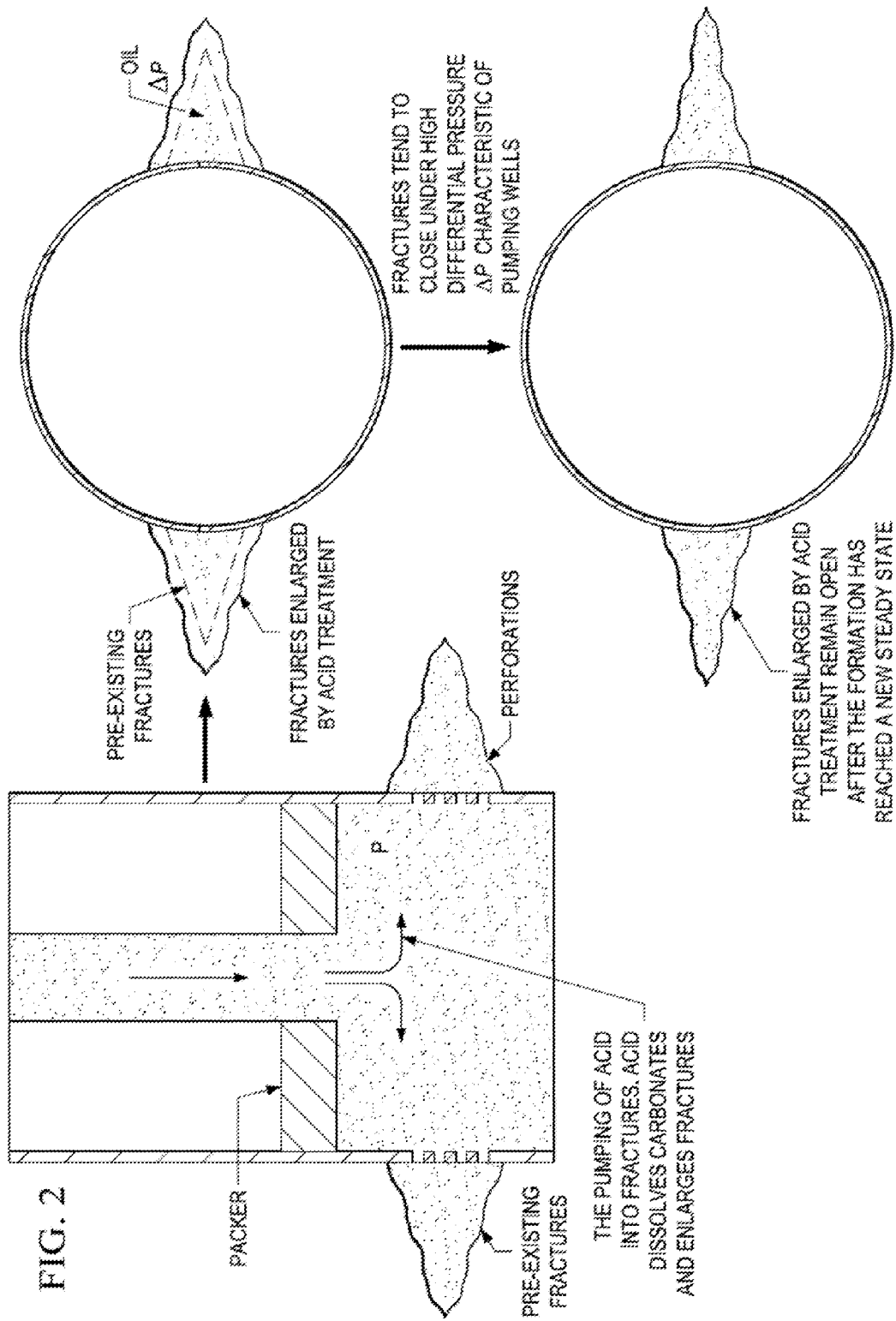
FIG. 2. schematic of acid fracking performed to enlarge existing fractures, often made by hydrofracking Not drawn to scale.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The disclosure provides a novel method of improving the permeability of a carbonate-rich reservoir, the method generally comprising cryogenic acid fracturing, such that the cold temperature decreases the reactivity of the acid, allowing it to penetrate deeply into the reservoir before being spent.

The major problems in obtaining fracture flow capacity in fracture acidizing are usually inadequate flow paths resulting from the etching process, and plugging of fracture channel with undissolved fines. Etching flow channels in the fracture faces is usually feasible in heterogeneous carbonate rocks. However, in homogeneous rocks, the fracture faces tend to etch uniformly, resulting in fracture closure soon after completion of the acidizing job. Dynamic laboratory etching tests are very useful in estimating the probability of a particular formation by fracture acidizing.

In some formations, regular or high strength acid fracturing may not provide sustained production increases if large quantities of fines are released in the fracturing by the acid treatment, thus blocking the fracture. Also, high strength acid may over-etch some very soluble carbonates, resulting in crushing of the pillars and posts after fracturing pressure is released or at a later date when reservoir pressure declines. Thus, the fracture would close, blocking linear flow paths to the wellbore.

The rubble formation created herein by the thermal stresses and frozen water in situ helps to solve the fines problem, providing a natural proppant and ensuring the fractures do not close after treatment.

Of course, not every limestone containing well is suited for acid fracking Factors more favorable to acid fracturing treatment in carbonate include:
- The carbonate formation is predominately naturally fractured—which could lead to complications in case of proppant fracturing.
- The formation is heterogeneous with porosity and permeability streaks that are conducive to a higher degree, enabling differential acid-etching of the fracture walls.
- Zone of interest is in close proximity to unwanted water or gas zone(s) not separated by stress barrier(s).
- Formation permeability is relatively high and/or near wellbore formation damage exists.
- The well will not mechanically accept proppant.

The present invention is exemplified with respect to LN2 and HCL. However, this is exemplary only, and the invention can be broadly applied to any acid and any cryogenic fluid that is cost effective and does not interfere with the carbonate reaction. The examples herein are intended to be illustrative only, and not unduly limit the scope of the appended claims.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

U.S. Pat. No. 3,452,818, Gidley & Tomer, "Acid Fracturing Process" (1969).
U.S. Pat. No. 3,707,192, Goins & McGlothlin, "Two-Stage Injection of Acid-Producing Chemicals for Stimulating Wells" (1972).
U.S. Pat. No. 3,822,747, Maguire, "Method Of Fracturing And Repressuring Subsurface Geological Formations Employing Liquified Gas," (1974).
U.S. Pat. No. 3,885,630, Richardson, "Buffer-regulated carbonate acidization," (1975).
U.S. Pat. No. 6,805,198, Huang, et al., "Organic acid system for high temperature acidizing," (2003).
U.S. Pat. No. 7,198,107, Maguire, "In-situ method of producing oil shale and gas (methane) hydrates, on-shore and off-shore," (2005).
U.S. Pat. No. 7,264,049, Maguire, "In-situ method of coal gasification," (2006).
U.S. Pat. No. 7,416,022, Maguire, "In-situ method of producing oil shale, on-shore and off-shore," (2007).
U.S. Pat. No. 7,500,517, Looney, et al., "Kerogen Extraction From Subterranean Oil Shale Resources," (2008).
U.S. Pat. No. 7,516,784, Maguire, "In-situ method of coal gasification," (2006).
U.S. Pat. No. 7,784,545, Maguire, "In-situ method of fracturing gas shale and geothermal areas," (2010).
U.S. Pat. No. 7,789,164, Looney, et al., "Kerogen extraction from subterranean oil shale resources," (2010).
U.S. Pat. No. 7,823,644, Maguire, "In-situ method of producing oil shale, on-shore and off-shore," (2010).
U.S. Pat. No. 8,104,536, Looney, et al., "Kerogen extraction from subterranean oil shale resources," (2012).
U.S. Pat. No. 8,551,926, Huang, "Stabilizing emulsified acids for carbonate acidizing," (2013).
CA2777449, Lanctot-Downs, et al., "Liquefied industrial gas based solution in hydraulic fracturing," (2013).
SP-21036: Mumallah N. A., Factors Influencing the Reaction Rate of Hydrochloric Acid and Carbonate Rock (1991).

What is claimed is:
1. A method of stimulating a reservoir for increased production of oil and gas; said method comprising:

a) selecting a reservoir that is a carbonate-rich reservoir having a well comprising tubulars;
b) injecting a preflush into said reservoir;
c) injecting a first warm gas flush into said reservoir, wherein said first warm gas is at a temperature above a liquifying temperature of a cryogenic liquid;
d) injecting said cryogenic liquid into said reservoir;
e) injecting a second warm gas flush into said reservoir;
f) injecting an at least 15% acid in water into said reservoir;
g) injecting a postflush into said reservoir to displace the acid from the tubulars into said reservoir;
h) shutting in well and allowing said cryogenic liquid to gasify and said acid to etch carbonate and enlarge existing fractures in said reservoir; and
i) producing oil or gas from said etched reservoir.

2. The method of claim 1, wherein said injection step b) includes or is preceded by injection of a fracturing fluid to fracture the reservoir.

3. The method of claim 1, wherein said cryogenic liquid comprises liquid nitrogen, liquid natural gas, liquid propane (R290), liquid ethane (R170), liquid carbon dioxide (R744), liquid nitrous oxide (R744A), liquid ethylene (R1150), liquid ammonia (R717), liquid butane (R600), liquid sulphur dioxide (R764), liquid sulfur hexafluoride, liquid helium, and combinations thereof.

4. The method of claim 1, wherein said acid is hydrochloric acid, muriatic acid, acetic acid, acrylic acid, boric acid, formic acid, glutaraldehyde, mercaptoacidic acid, sodium chlorate, sodium hypochlorate, sulfuric acid, phosphonic acid, and combinations thereof.

5. The method of claim 1, wherein said cryogenic liquid is liquid nitrogen and said acid is hydrochloric acid.

6. The method of claim 1, wherein said cryogenic liquid is combined with a solvent comprising kerosene, diesel, naphtha, natural gas condensates, petroleum distillates, ethylene glycol, and combinations thereof.

7. A method of acid fracking a carbonate-rich reservoir; said method comprising
providing a wellbore comprising tubulars in a carbonate-rich reservoir;
injecting a fracture fluid at a pressure high enough to fracture said reservoir;
injecting a preflush into said reservoir;
injecting a mixture of cryogenic liquid, solvent, and acid into said wellbore;
injecting an postflush into said reservoir displacing said mixture from the tubulars;
shutting said wellbore in and allowing the well to stand until said cryogenic liquid gasifies and said acid etches said fractures in said carbonate rich reservoir; and
opening said well for backflow and production of hydrocarbons.

8. The method of claim 7, wherein said cryogenic liquid comprises liquid nitrogen, liquid natural gas, liquid propane (R290), liquid ethane (R170), liquid carbon dioxide (R744), liquid nitrous oxide (R744A), liquid ethylene (R1150), liquid ammonia (R717), liquid butane (R600), liquid sulphur dioxide (R764), liquid sulfur hexafluoride, liquid helium, and combinations thereof.

9. The method of claim 7, wherein said acid is hydrochloric acid, muriatic acid, acetic acid, acrylic acid, boric acid, formic acid, glutaraldehyde, mercaptoacidic acid, sodium chlorate, sodium hypochlorate, sulfuric acid, phosphonic acid, and combinations thereof.

10. The method of claim 7, wherein said cryogenic liquid is liquid nitrogen and said acid is hydrochloric acid.

11. The method of claim 7, wherein said cryogenic liquid is combined with a solvent comprising kerosene, diesel, naphtha, natural gas condensates, petroleum distillates, ethylene glycol, and combinations thereof.

12. An improved method of acid fracturing a carbonate-rich reservoir, wherein acid is injected into a partially fractured reservoir and etches and enlarges said partial fractures, thus stimulating production of a fluid from said reservoir, the improvement comprising injecting a cryogenic liquid and an at least 15% acid in water into said partially fractured reservoir, such that the cryogenic liquid reduces the reaction rate of said acid, allowing said acid and said cryogenic liquid to penetrate deeper into said reservoir than 15% acid without said cryogenic liquid could penetrate, thus enlarging said partial fractures deeper in said reservoir, thus stimulating increased production of said fluid from said reservoir.

13. The method of claim 12, wherein said cryogenic liquid is preceded by injection of a fracturing fluid to fracture the reservoir.

14. The method of claim 12, wherein said cryogenic liquid comprises liquid nitrogen, liquid natural gas, liquid propane (R290), liquid ethane (R170), liquid carbon dioxide (R744), liquid nitrous oxide (R744A), liquid ethylene (R1150), liquid ammonia (R717), liquid butane (R600), liquid sulphur dioxide (R764), liquid sulfur hexafluoride, liquid helium, and combinations thereof.

15. The method of claim 12, wherein said acid is hydrochloric acid, muriatic acid, acetic acid, acrylic acid, boric acid, formic acid, glutaraldehyde, mercaptoacidic acid, sodium chlorate, sodium hypochlorate, sulfuric acid, phosphonic acid, and combinations thereof.

16. The method of claim 12, wherein said cryogenic liquid is liquid nitrogen and said acid is hydrochloric acid.

17. The method of claim 12, wherein said cryogenic liquid is combined with a solvent comprising kerosene, diesel, naphtha, natural gas condensates, petroleum distillates, ethylene glycol, and combinations thereof.

* * * * *